United States Patent
Chu et al.

(10) Patent No.: US 7,296,179 B2
(45) Date of Patent: *Nov. 13, 2007

(54) NODE REMOVAL USING REMOTE BACK-UP SYSTEM MEMORY

(75) Inventors: Simon C. Chu, Chapel Hill, NC (US); Richard A. Dayan, Raleigh, NC (US); Brandon J. Ellison, Raleigh, NC (US); Eric R. Kern, Durham, NC (US); William B. Schwartz, Apex, NC (US); Adam L. Soderlund, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 850 days.

This patent is subject to a terminal disclaimer.

(21) Appl. No.: 10/675,621

(22) Filed: Sep. 30, 2003

(65) Prior Publication Data

US 2005/0071587 A1   Mar. 31, 2005

(51) Int. Cl.
 *G06F 11/00* (2006.01)
(52) U.S. Cl. ............................. 714/6; 714/48; 711/162
(58) Field of Classification Search ................ 714/6
 See application file for complete search history.

(56) References Cited

U.S. PATENT DOCUMENTS

| | | | |
|---|---|---|---|
| 6,505,305 B1 * | 1/2003 | Olarig | 714/5 |
| 6,978,398 B2 * | 12/2005 | Harper et al. | 714/13 |
| 7,055,056 B2 * | 5/2006 | Bessire | 714/6 |
| 7,143,315 B2 * | 11/2006 | Rust et al. | 714/42 |
| 2001/0039632 A1 * | 11/2001 | MacLaren et al. | 714/6 |
| 2002/0002448 A1 * | 1/2002 | Kampe | 703/22 |
| 2002/0010875 A1 * | 1/2002 | Johnson et al. | 714/5 |
| 2004/0153723 A1 * | 8/2004 | Depew et al. | 714/6 |
| 2004/0172508 A1 * | 9/2004 | Nguyen et al. | 711/162 |
| 2004/0205384 A1 * | 10/2004 | Lai et al. | 714/6 |
| 2005/0086405 A1 * | 4/2005 | Kobayashi et al. | 710/260 |
| 2005/0097208 A1 * | 5/2005 | Chu et al. | 709/224 |
| 2005/0243713 A1 * | 11/2005 | Okuda | 370/216 |

* cited by examiner

*Primary Examiner*—Robert W. Beausoliel
*Assistant Examiner*—Emerson Puente
(74) *Attorney, Agent, or Firm*—Cynthia S. Byrd; Dillon & Yudell LLP (57) ABSTRACT

A method and system for method of removing a node from a multi-node computer. The node receives a system management interrupt (SMI), resulting in a quiescenting of only that node. The SMI receiving node then polls other nodes in the multi-node computer to determine if the SMI affects an operation of any of the other nodes, and quiescents any other node affected by the SMI. Each quiescent node then transfers all of the contents of its system memory to a backup memory in an unaffected remote node in the multi-node computer. The remote node than assumes the function of the removed node that had received the SMI. The method and system thus allows node removal in the event of a hot-swap request or a predicted failure of a node.

14 Claims, 6 Drawing Sheets

NODE REMOVAL USING REMOTE BACK-UP SYSTEM MEMORY

BACKGROUND OF THE INVENTION

1. Technical Field

The present invention relates in general to the field of computers, and in particular to multi-node computers. Still more particularly, the present invention relates to a method and system for removing a node, or a sub-node, from the multi-node computer after transferring the contents of the node's system memory to a remote node's back-up dynamic memory.

2. Description of the Related Art

Figure 1:
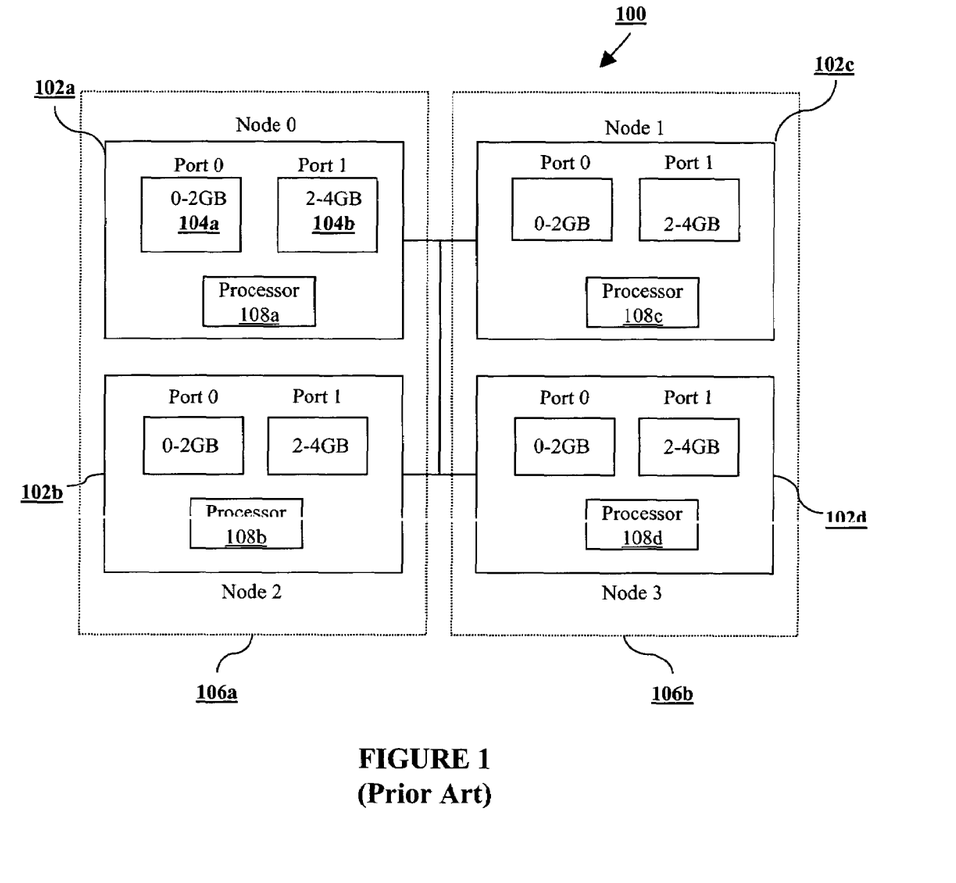
FIG. 1 depicts a prior art multi-node computer system having no system memory dynamic back-up.

A multi-node computer is made up of a multiple nodes, each having its own processor or set of processors. Typically, the multiple nodes work in a coordinated fashion under the direction of a primary supervisory service processor in one of the nodes. An example of a multi-node computer is shown in FIG. 1 as multi-node computer system 100. Each node 106 includes multiple sub-nodes 102. Each sub-node 102 includes a processor 108, which is typically multiple processors acting in a coordinated manner. Each sub-node 102 has two modules of system memory 104, which are volatile memory chips, typically mounted on a either a single in-line memory module (SIMM) or a dual in-line memory module (DIMM). As shown in FIG. 1, these memory modules are assigned to Port 0 and Port 1, and have sequential memory addresses, shown in the example of sub-node 102a as addresses associated with the first two gigabytes of memory (dynamic memory 104a) and the next sequential two gigabytes of memory (dynamic memory 104b).

The system memory configuration shown in FIG. 1 does not provide for redundancy. Thus, if a node 106, a sub-node 102, or even one module of memory 104 should fail, or if a node 106 or sub-node 102 is suddenly taken off line from multi-node computer system 100, the data in the failed/removed node's memory cannot be recovered.

Figure 2:
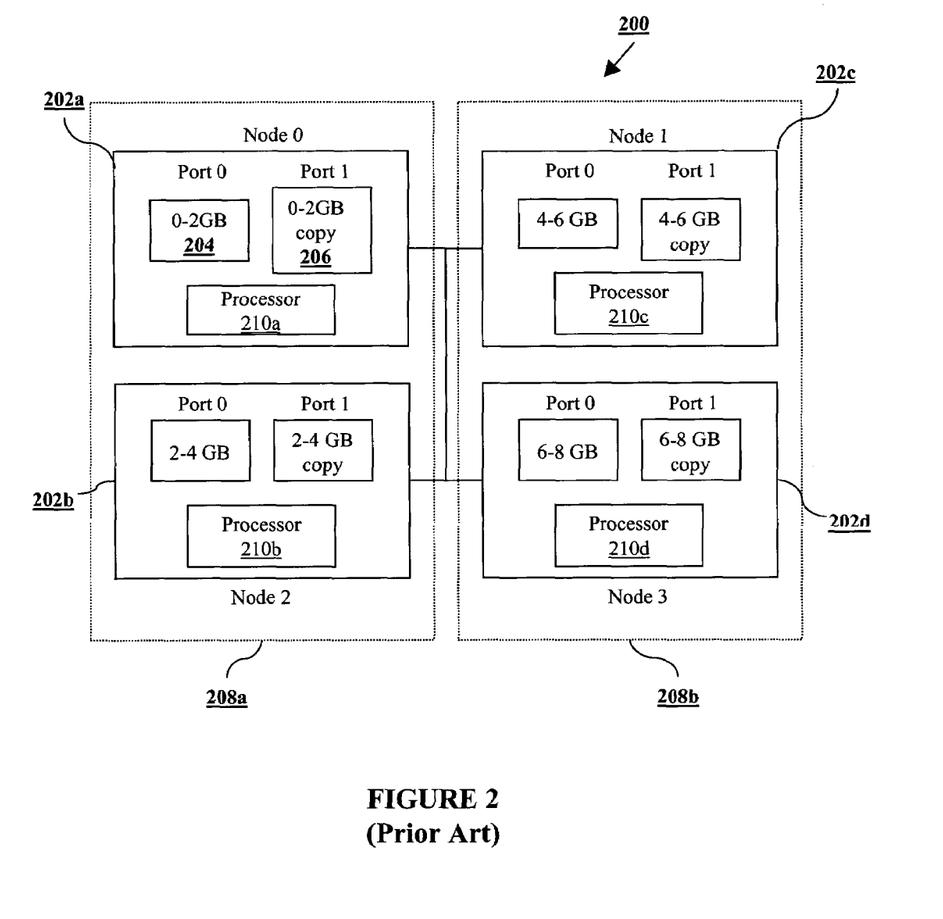
FIG. 2 illustrates a prior art multi-node computer system having local system memory dynamic back-up.

To address the problem of data loss from a dynamic memory failure in a sub-node, FIG. 2 depicts a prior art solution involving local back-up memory. Each node 208 in multi-node computer system 200 includes sub-nodes 202, each having a processor 210. Each sub-node 202 has a primary dynamic memory 204 and a local back-up memory 206, which stores an exact copy of the system memory stored in primary dynamic memory 204, typically using the same memory addresses. Such a system affords some degree of data protection, since failure of either primary dynamic memory 204 or local back-up memory 206 allows a sub-node 202 to continue to operate using the local memory that did not fail. However, if the entire sub-node 202 should fail or be suddenly pulled off-line from multi-node computer system 200, such as in a "hot-swap," then the data in the failed/removed sub-node 202 is lost to the multi-node computer system 200.

Thus, there is a need for a method and system that permits a removal of a node or sub-node from a multi-node computer system through the retention of system memory data from the node or sub-node being removed, preferably without reducing the total memory size of the multi-node computer system.

SUMMARY OF THE INVENTION

The present invention is thus directed to a method and system for removing a node from a multi-node computer after retaining, in another node in the multi-node computer, data from the removing node's system memory. The node to be removed receives a system management interrupt (SMI), resulting in a quiescenting of only that node. The SMI receiving node then polls other nodes in the multi-node computer to determine if the SMI affects an operation of any of the other nodes, and quiescents any other node affected by the SMI. Each quiescent node then transfers all of the contents of its system memory to a backup memory in an unaffected remote node in the multi-node computer. The remote node then assumes the function of the removed node that received the SMI. The method and system thus allows node removal in the event of a hot-swap request or a predicted failure of a node.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 3A:
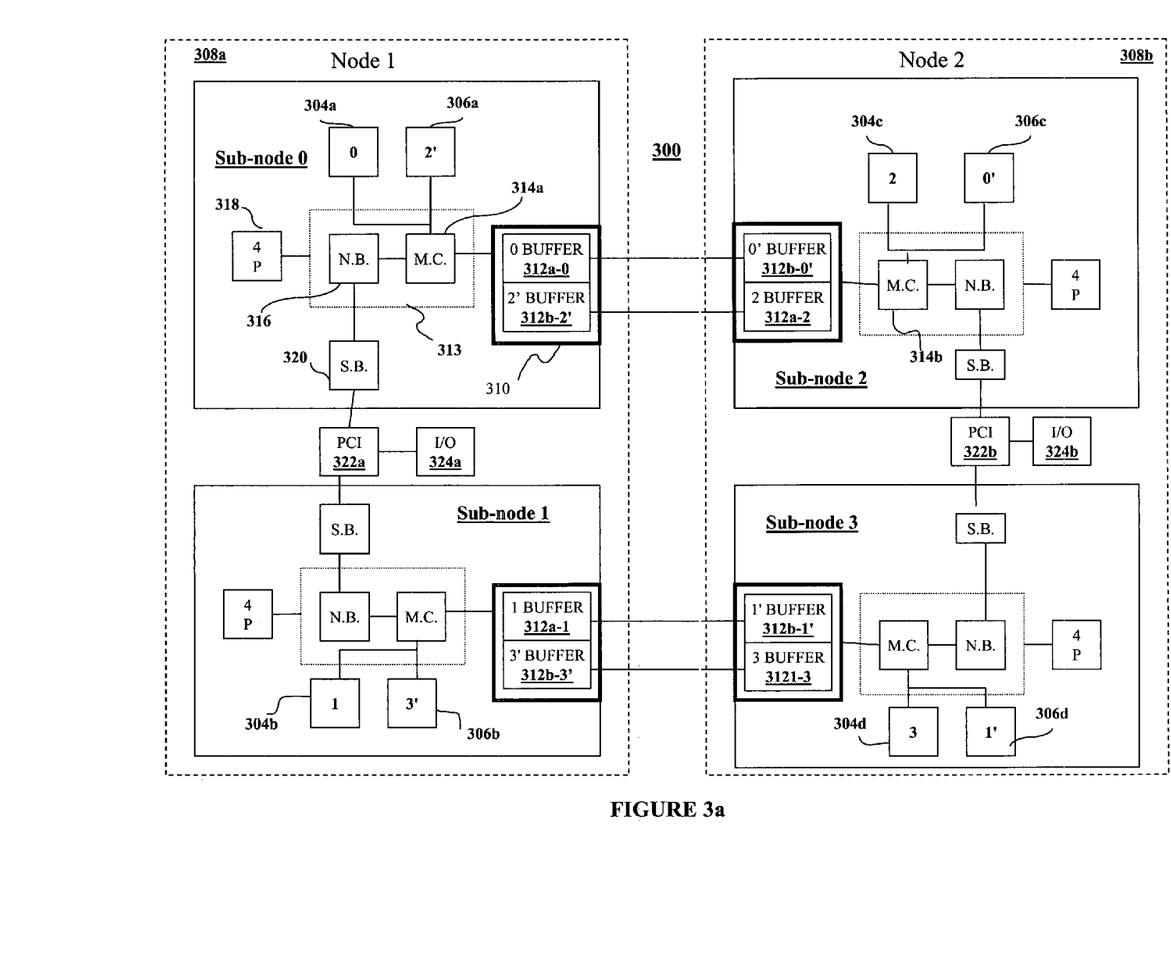
FIG. 3a depicts a preferred embodiment of the inventive multi-node computer system, in which each sub-node in a node has system memory dynamic back-up in a remote sub-node.

With reference now to FIG. 3a, there is depicted a schematic block diagram of a multi-node computer system 300 according to the present invention. Multi-node computer system 300 has at least two nodes 308, each of which has at least one sub-node. Each node 308 functions as a discrete processing unit, having a shared Peripheral Component Interconnect (PCI) 322 connected to the Southbridge 320 of each sub-node in node 308. Each node 308 includes a scalability chipset 313, which includes a Northbridge 316 connected to the node's Southbridge 320. Connected to scalability chipset 313 is processor 318, preferably multiple processors, and scalability port 310, about which more is discussed below.

Also within scalability chipset 313 is a memory controller 314, which controls multiple volatile memories, such as primary volatile memory 304 and back-up volatile memory 306. Primary volatile memory 304, preferably in a Single In-Line Memory Module (SIMM) or a Dual In-Line Memory Module (DIMM), holds the system memory for processor 318 in the sub-node. Back-up volatile memory 306 is a back-up memory for a system memory used in a remote node/sub-node. For example, in FIG. 3*a*, back-up volatile memory 306*a* contains a back-up copy of sub-node 2's system memory that is contained in volatile memory 304*c*. Similarly, sub-node 0's system memory, whose original copy is stored in volatile memory 304*a*, has a back-up copy stored remotely in back-up volatile memory 306*c*. Note that in a preferred embodiment of the present invention, local and back-up system memories are arranged such that if an entire node should go down, no system memories are lost. Thus in FIG. 3*a*, node 308*b* contains local system memories in sub-nodes 2 and 3, as well as back-up copies of system memories for sub-nodes 0 and 1 of node 308*a*.

Alternatively, the location and placement of back-up copies of system memories is dependent on an affinity one node has for another. This affinity may be determined by shared system memories, common or related processes, or other factors that make two nodes or sub-nodes closely aligned. Thus if sub-node 0 is running a process that utilizes common data as a process running in sub-node 2, then the back-up copy of sub-node 0's system memory is stored in sub-node 2, which allows sub-node 2 to be able to access and use the back-up copy of sub-node 0's system memory, assuming memory coherence is not an issue or is addressed in some other manner.

Back-up copies of system memory are under the control of memory controllers 314. In a preferred embodiment of the present invention, every time a write is made to a local primary volatile memory 304, a corresponding write is made to a remote back-up volatile memory 306. For example, when a write is made to the system memory in volatile memory 304*a* in sub-node 0, a back-up write is also made to the back-up volatile memory 306*c* in sub-node 2. To perform the back-up write, memory controller 314*a* sends a write command with data to both local volatile memory 304*a* as well as to a sending interface buffer 312*a*-0. Sending interface buffer 312*a*-0, which preferably is a write-through cache, sends the write command and data to a receiving interface buffer 312*b*-0', which forwards the write command and data to memory controller 314*b* in sub-node 2. Memory controller 314*b* sends the write command and data to back-up volatile memory 306*c*, which thus keeps an updated copy of the system memory of sub-node 0. Note that as long as sub-node 0 is functioning normally and is on-line, the back-up system memory in back-up volatile memory 306*c* is not used by any system.

Likewise, whenever memory controller 314*b* sends a write command to primary volatile memory 304*c* updating the system memory of sub-node 2, a write command and the data update is sent by memory controller 314*b* to back-up volatile memory 306*a* via a sending interface buffer 312*a*-2 and a receiving interface buffer 312*b*-2'. Thus, back-up volatile memory 306*a* contains a valid current copy of sub-node 2's system memory.

PCI 322 is a common interface for input/output (I/O) 324 for two sub-nodes as long as both sub-nodes are on-line. For example, PCI 322*a* and I/O 324*a* provide an input/output interface for both sub-node 0 and sub-node 1 as long as sub-node 0 and sub-node 1 are operating normally in node 308*a*. However, if sub-node 0 should be removed, such as in the event of a failure of sub-node 0, then PIC 322*a* and I/O 324*a* provide an input/output interface to only sub-node 1.

Figure 3B:
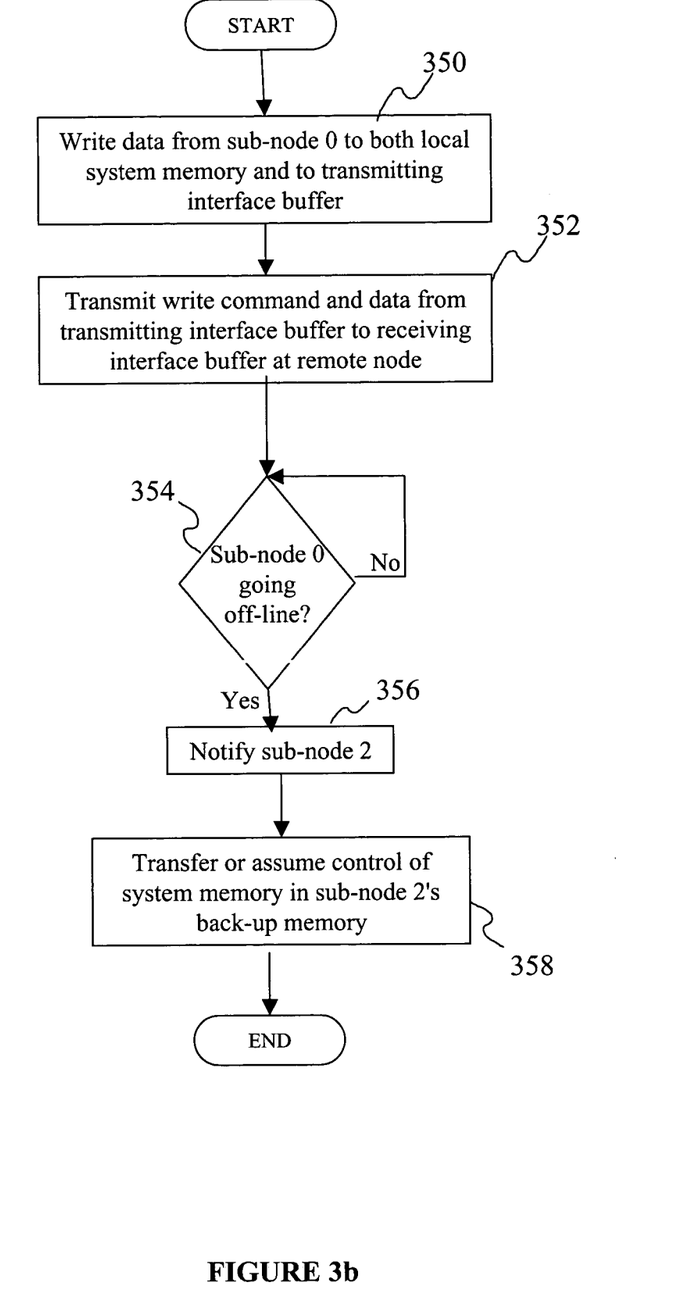
FIG. 3b is a flow-chart of storage and use of remote system memory as utilized in one embodiment of the present invention.

FIG. 3*b* is a flow-chart describing the storage and use of remote back-up system memory utilizing the exemplary system shown in FIG. 3*a*. Whenever data is written to system memory in a first sub-node such as sub-node 0, the data is also written to the transmitting interface buffer (block 350). The write command and data are then transmitted from the transmitting interface buffer to a receiving interface buffer located on a remote sub-node of a remote node (block 352). As long as the first sub-node remains on-line with the multi-node computer, no further steps are taken, assuming that there are no new writes to system memory in the first sub-node (block 354). However, if the first sub-node should fail or otherwise go off-line from the multi-node computer, then remote sub-node 2 is so notified (block 356). The remote sub-node then either takes over the role of sub-node 0 by making the back-up memory in the remote sub-node 2 its primary system memory, or else the remote sub-node 2 transfers its back-up memory containing sub-node 0's system memory to another active sub-node's primary system memory, which allows that sub-node to assume the role, function and identity of the failed sub-node 0 (block 358).

The system and method described in FIGS. 3*a-b* thus incorporate the concept of having an up-to-date copy of system memory in a remote sub-node at all times, allowing the first local sub-node to be removed if the first local sub-node fails or is re-allocated to another node or similar subsystem. Similarly, if an entire node is to be removed from a system, then all sub-nodes' role, identity and function is assumed by other remote sub-nodes, thus permitting "hot-swapping" of nodes in and out of systems.

Figure 4:
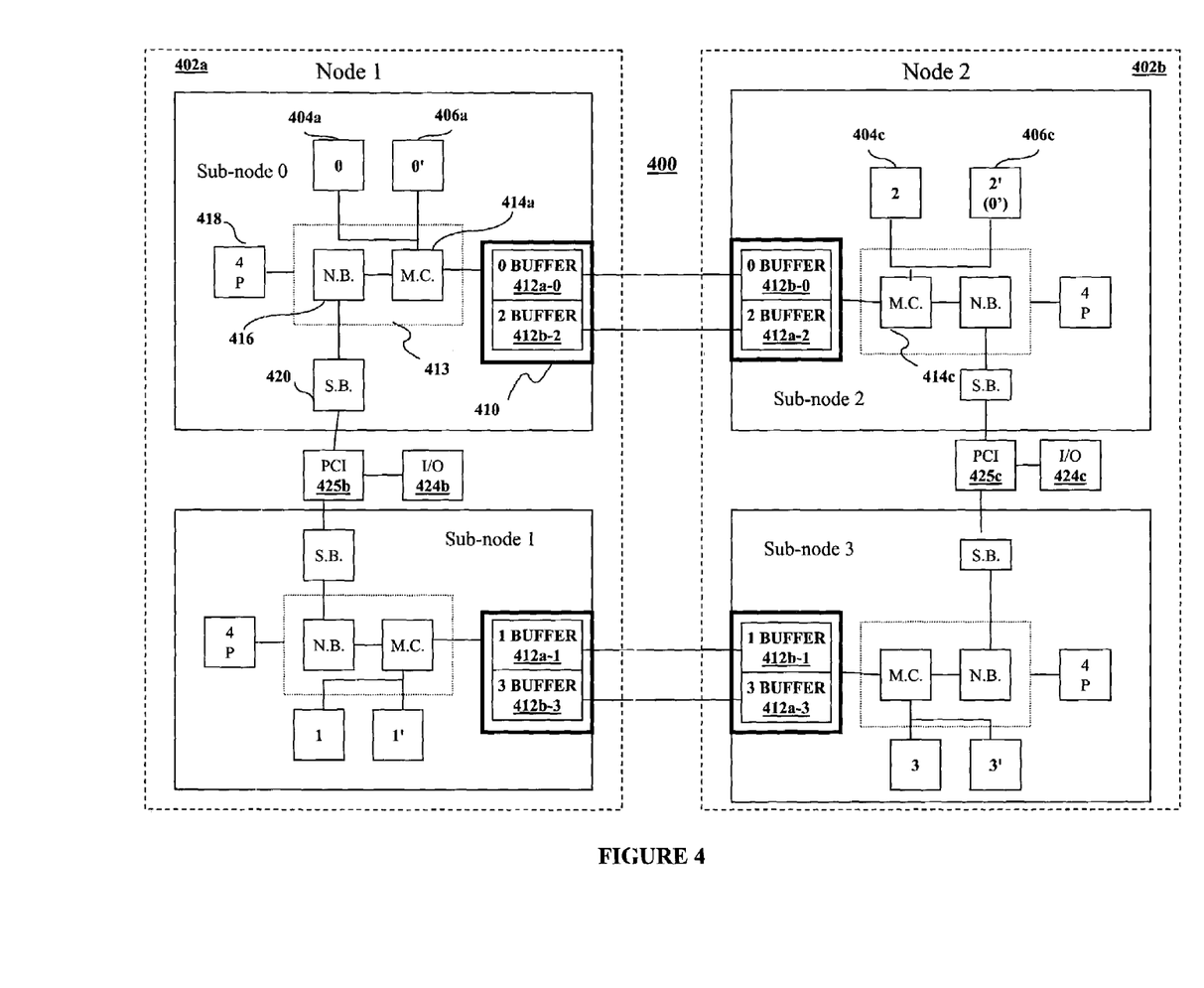
FIG. 4 illustrates a preferred embodiment of the inventive multi-node computer system, in which each sub-node has a local system memory dynamic back-up along with buffer interfaces and scalability chipsets that enable movement of a first sub-node's system memory to a back-up dynamic memory in another sub-node, wherein the back-up dynamic memory was previously utilized as a local back-up dynamic memory for the system memory of the second sub-node.

To avoid the expense of monitoring and controlling where (in which remote sub-node) a local sub-node's system memory is backed up, the present invention also contemplates local system memory back-up. Local system memory back-up affords faster system memory writes and reads, as the data does not have to pass through local and remote interface buffers, and the data is touched only once by the local memory manager. Thus, FIG. 4 illustrates a multi-node computer system 400 having multiple nodes 408, each having at least one sub-node 402. Sub-nodes 402 each have a dynamic memory 404 for storing an active system memory data, plus a local back-up memory 406 for storing a back-up copy of the sub-node's system memory. Each sub-node also has a scalability port 410, having interface buffers 412, a memory controller that controls contemporaneous reads/writes to both dynamic memory 404 and local back-up memory 406, as well as a Northbridge 416, processor(s) 418, and a PCI interface 422 with an I/O 424.

Figure 5:
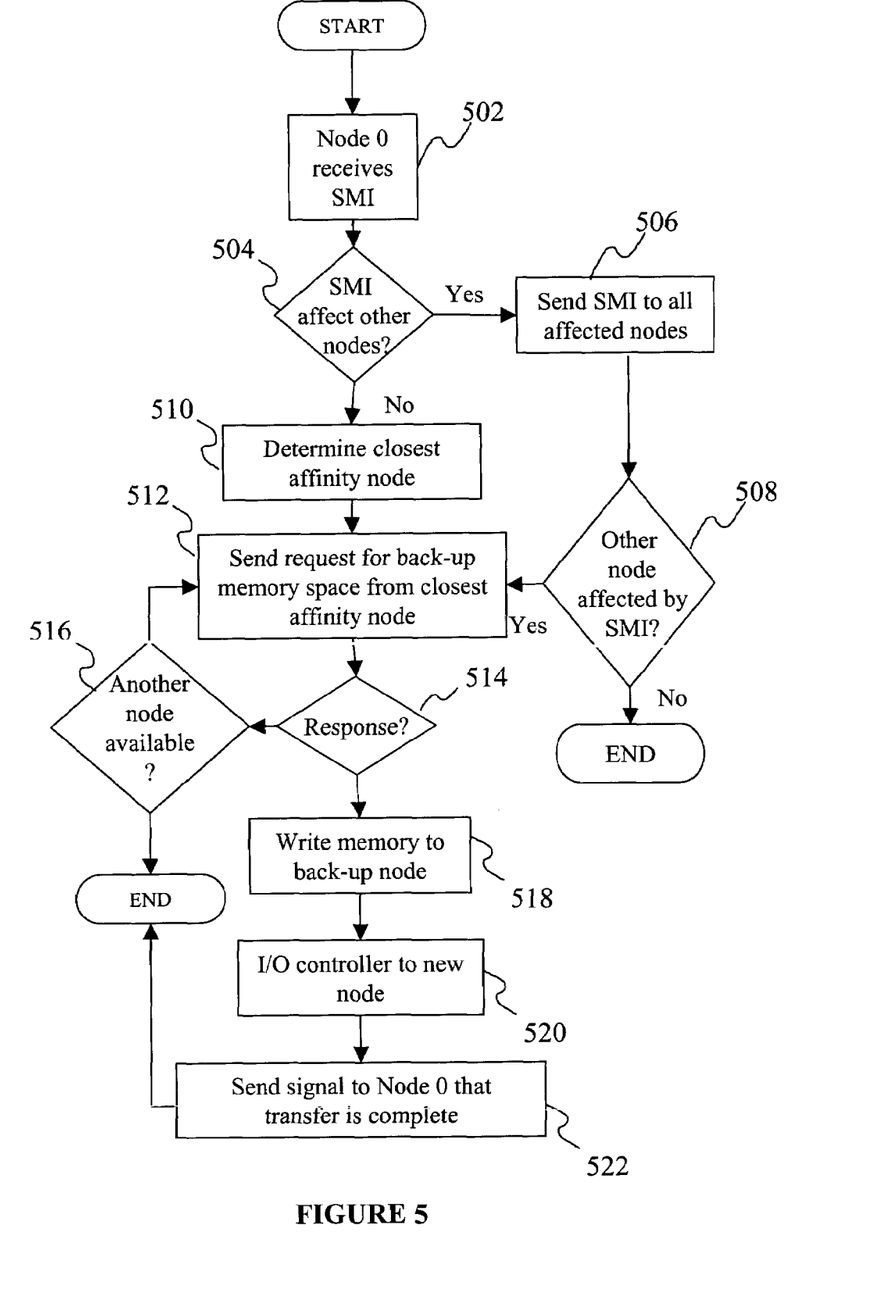
FIG. 5 is a flow-chart of a removal of a node in the multi-node computer system in response to a system management interrupt (SMI).

In the event of a failure of dynamic memory 404 or local back-up memory 406, the sub-node 402 may continue to operate normally, since a valid copy of system memory is still available. However, if both dynamic memory 404 and local back-up memory 406 fail, then there is a complete failure of the sub-node 402 housing the failed memories. In either event, the failed/failing sub-node can appropriate a remote back-up memory from another sub-node. Particularly, if both memories are failing, or are both predicted to fail, then the system memory of the sub-node housing the failing memories must be transferred to a remote sub-node. For example, if there is a prediction that dynamic memory 404*a* and local back-up memory 406*a* are about to fail, or sub-node 0 is about to fail for some other reason (such as a power failure, processor failure, bus failure, etc.), then the system memory stored in either dynamic memory 404*a* or local back-up memory 406*a* (assuming both memories contain valid copies of the system memory currently in use by sub-node 0), is sent to a remote sub-node such as sub-node 2. In this case, the system memory is sent to back-up dynamic memory 406c by over-writing the back-up system memory for sub-node 2. FIG. 5 illustrates such a process.

Starting at block 502, assume that sub-node 0 develops or receives a system management interrupt (SMI). A query (query block 504) is sent out asking if there are any other nodes or sub-nodes that are or may be affected by the SMI. If so (block 506), the SMI is sent to all possibly affected nodes/sub-nodes, and the other node/sub-node is affected (block 508) those nodes/sub-nodes follow the process followed by the first node/sub-node. Returning to query block 504, the first sub-node 0 determines which node or sub-node has a close affinity to sub-node 0. This affinity may be due to similar process priorities, similar data used/manipulated, or physical proximity between nodes/sub-nodes. Alternately, a sub-node may be chosen because it does NOT have an affinity with sub-node 0, particularly if sub-node 0 and the other sub-node are within the same node, which may have a higher likelihood of total failure if one of its sub-nodes fails.

Looking now to block 512, once another sub-node is selected, a request is sent from sub-node 0 requesting permission to appropriate (commandeer) the back-up dynamic memory 406 of a remote sub-node, such as sub-node 2. If sub-node 2 agrees to donate its back-up dynamic memory 406c to sub-node 0 (query block 514), then the writing of sub-node 0's system memory to back-up dynamic memory 406c begins (block 518). Otherwise, another sub-node is asked (query block 516) until some sub-node donates its back-up dynamic memory, or else the back-up fails (end). The granting of permission to sub-node 0 to appropriate the back-up dynamic memory 406c is preferably under the control and direction of memory controller 414c in sub-node 2, although a remote system manager may make this decision.

Once the system memory from sub-node 0 is written to back-up dynamic memory 406c, sub-node 2's I/O 424c is configured to be the I/O for processes previously communicated to sub-node 0 (block 520). A message is then sent from sub-node 2 to sub-node 0 indicating that the system memory transfer is complete (block 522), along with the transfer of the location identity (for I/O purposes) of sub-node 0.

The present invention therefore provides a method and system for allowing a node/sub-node to be removed from a multi-node computer system, because of a node failure, a volitional election to re-allocate the node/sub-node to another task, or a volitional removal of the node/sub-node for maintenance or other elections.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A multi-node computer system comprising:
   a local node, the local node comprising at least one local sub-node, the at least one local sub-node including a first local sub-node, the first local sub-node comprising:
   a local dynamic memory, the local dynamic memory being a volatile system memory used by a processor in the first local sub-node;
   a scalability port including a write-through transmit buffer associated with the local dynamic memory; and
   a first scalability chipset comprising a first memory controller that directs a write of data to the local dynamic memory simultaneous with a back-up write of the data to the write-through transmitting buffer;
   a remote node, the remote node comprising at least one remote sub-node, the at least one remote sub-node including a first remote sub-node, the first remote sub-node comprising:
   a back-up memory for the local dynamic memory of the first local sub-node, the back-up memory being distinct form local system memory of the first remote sub-node;
   a receiving interface buffer for receiving, from the write-though transmit buffer associated with the local dynamic memory of the first sub-node, data written to the local dynamic memory of the first sub-node; and
   a second scalability chipset comprising a second memory controller that directs a write to the back-up memory of data received at the receiving interface buffer; and
   an input/output controller in the second scalability chipset that assigns a location identity of the first local sub-node to a replacement sub-node only if the first local sub-node is removed from the multi-node computer system, the location identity based on a memory map included in the data stored in the back-up memory in the first remote sub-node.

2. The multi-node computer system of claim 1, wherein the replacement sub-node is the first remote sub-node.

3. The multi-node computer system of claim 1, wherein the replacement sub-node is a second remote sub-node of the remote node, the second remote sub-node having received and stored the data from the back-up memory of the first remote sub-node.

4. The multi-node computer system of claim 1, wherein the replacement sub-node is a second local sub-node of the local node, the second local sub-node having received and stored the data from the back-up memory of the first remote sub-node.

5. The multi-node computer system of claim 1, wherein the first local sub-node is removed as a hot swap, in which all other nodes of the multi-node computer system remain non-quiescent.

6. A method of removing a node from a multi-node computer, the method comprising:
   receiving a system management interrupt (SMI) in a node in a multi-node computer;

quiescenting only the node receiving the SMI;

polling other nodes in the multi-node computer to determine if the SMI affects an operation of any of the other nodes;

quiescenting any other SMI affected node; and transferring all of the contents of any affected node's system memory to a backup memory in an unaffected node in the multi-node computer, wherein the unaffected node assumes all operations of the node that received the SMI, thus allowing the node to be removed from the multi-node computer.

7. The method of claim 6, wherein the SMI is in response to a request to hot-swap out the node.

8. The method of claim 6, wherein the SMI is in response to a predicted failure of the node.

9. A method of removing a sub-node from a multi-node computer, the method comprising:

receiving a system management interrupt (SMI) in a sub-node in a multi-node computer;

quiescenting only the sub-node receiving the SMI;

polling other sub-nodes in the multi-node computer to determine if the SMI affects an operation of any of the other sub-nodes;

quiescenting any other SMI affected sub-node; and transferring all of the contents of each affected sub-node's system memory to a backup memory in a respective unaffected sub-node in the multi-node computer, wherein the unaffected sub-node assumes all operations of the sub-node that received the SMI, thus allowing the sub-node to be removed from the multi-node computer.

10. The method of claim 9, wherein the unaffected sub-node is in a node that does not include the SMI affected sub-node.

11. The method of claim 9, wherein the unaffected sub-node is in a same node as the SMI affected sub-node.

12. A computer readable storage medium encoded with a computer program, wherein the computer program comprises;

program code for receiving a system management interrupt (SMI) in a node in a multi-node computer;

program code for quiescenting only the node receiving the SMI;

program code for polling other nodes in the multi-node computer to determine if the SMI affects an operation of any of the other nodes;

program code for quiescenting any other SMI affected node; and program code for transferring all of the contents of any affected node's system memory to a backup memory in an unaffected node in the multi-node computer, wherein the unaffected node assumes all operations of the node that received the SMI, thus allowing the node to be removed from the multi-node computer.

13. The computer readable storage medium of claim 12, wherein the SMI is in response to a request to hot-swap out the node.

14. The computer readable storage medium of claim 12, wherein the SMI is in response to a predicted failure of the node.

* * * * *